US012771063B2

(12) United States Patent
Zhang et al.

(10) Patent No.: US 12,771,063 B2
(45) Date of Patent: Oct. 20, 2026

(54) LATCH AND CONNECTOR

(71) Applicant: BIZLINK INTERNATIONAL CORP., New Taipei City (TW)

(72) Inventors: Yanping Zhang, New Taipei City (TW); Qixing Xu, New Taipei City (TW); Haoran Zou, New Taipei City (TW)

(73) Assignee: BIZLINK INTERNATIONAL CORP., New Taipei City (TW)

( * ) Notice: Subject to any disclaimer, the term of this patent is extended or adjusted under 35 U.S.C. 154(b) by 374 days.

(21) Appl. No.: 18/527,382

(22) Filed: Dec. 4, 2023

(65) Prior Publication Data

US 2025/0055223 A1 Feb. 13, 2025

(30) Foreign Application Priority Data

Aug. 7, 2023 (CN) ......................... 202310985260.8

(51) Int. Cl.
*H01R 13/627* (2006.01)

(52) U.S. Cl.
CPC ................................ *H01R 13/6275* (2013.01)

(58) Field of Classification Search
CPC .................................................. H01R 13/6275
USPC ........................................................... 439/345
See application file for complete search history.

(56) References Cited

U.S. PATENT DOCUMENTS 5,022,866 A * 6/1991 Harting ................ H01R 13/629 439/372
5,401,179 A * 3/1995 Shinchi ............ H01R 13/62933 439/372
5,417,513 A * 5/1995 Hayashi ........... H01R 13/62938 403/321
5,445,530 A * 8/1995 Inoue ............... H01R 13/62938 439/157
5,658,162 A * 8/1997 Harting ............ H01R 13/62966 439/372

(Continued)

FOREIGN PATENT DOCUMENTS

| | | |
|---|---|---|
| CN | 1081837 C | 3/2002 |
| CN | 102763289 B | 4/2016 |
| EM | 001209043-0027 | 6/2010 |

OTHER PUBLICATIONS

Han-Eco Mod.6-HSE-M32-glanded, Harting, part No. 19411060522, Creation date Jan. 11, 2022.

*Primary Examiner* — Harshad C Patel
(74) *Attorney, Agent, or Firm* — CKC & Partners Co., LLC

(57) ABSTRACT

The invention provides a latch and a connector. The latch includes a handle and two baffles. The baffles are disposed on opposite ends of the handle, and opposite to each other. Each baffle includes a main body and a metal sheet. A front end portion of the main body is recessed with pivoting and locking portions, the main body has first and second openings, the first opening communicates with an inner side surface of the pivoting portion, and the second opening communicates with an inner side surface of the locking portion. The metal sheet is disposed in the main body and has an anti-wear portion exposed through the second opening. Latching columns of a connector assembly are latched into the locking portion through the anti-wear portion, such that it prevents the latching columns from directly rubbing against the main body, thereby effectively prolonging the service life of the latch.

16 Claims, 7 Drawing Sheets

(56) References Cited

U.S. PATENT DOCUMENTS

| | | | | | |
|---|---|---|---|---|---|
| 6,142,787 | A * | 11/2000 | Ikesugi | H01R 13/62933 | 439/372 |
| 6,705,882 | B2 * | 3/2004 | Casses | H01R 13/62933 | 439/153 |
| 6,969,283 | B2 * | 11/2005 | Schmidt | H01R 13/516 | 439/687 |
| 7,717,723 | B2 * | 5/2010 | Nehm | H01R 13/62966 | 439/372 |
| 7,785,131 | B2 * | 8/2010 | Ferderer | H01R 13/62933 | 439/372 |
| 7,938,685 | B2 * | 5/2011 | Zwanger | H01R 13/516 | 439/372 |
| D648,274 | S | 11/2011 | Spilker et al. | | |
| 8,376,772 | B2 * | 2/2013 | Lizanets | H01R 13/5202 | 439/372 |
| 8,979,568 | B2 * | 3/2015 | Herbrechtsmeier | H01R 13/62966 | 439/346 |
| 9,407,036 | B2 * | 8/2016 | Andresen | H01R 13/62933 | |
| D788,707 | S | 6/2017 | Griepenstroh et al. | | |
| D789,296 | S | 6/2017 | Griepenstroh et al. | | |
| 11,336,055 | B2 * | 5/2022 | Kropiewnicki | H01R 13/62955 | |
| 11,495,914 | B2 * | 11/2022 | Dobernig | H01R 13/62944 | |
| 2011/0053405 | A1 * | 3/2011 | Kobayashi | H01R 13/62955 | 439/345 |
| 2014/0302698 | A1 * | 10/2014 | Nagamine | H01R 12/721 | 439/345 |

* cited by examiner

LATCH AND CONNECTOR

RELATED APPLICATIONS

This application claims priority to China Application Serial Number 202310985260.8, filed Aug. 7, 2023, which is herein incorporated by reference.

BACKGROUND

Field of Invention

The present invention relates to a connecting device, and more particularly, to a latch and a connector having the latch.

Description of Related Art

It is common in the industry to use wire end connectors for high power supply to power high power electronic devices, such as servers, as those described in China Patent No. CN102763289B or CN1081837C.

Taking the above patents as examples, in order to fix the wire end connector on the board end connector, a rotatable latch (or locking clip) is usually used to combine the wire end connector and the board end connector.

However, the latches are generally plastic elements, and latching and unlatching will wear and damage the latches, thus decreasing the service life of the latches. In addition, the holding portion of the typical latch for the user is level with the bottom surface of the latch, such that it is difficult for the user to pull the handle.

SUMMARY

Therefore, one objective of the present disclosure is to provide a connector and a latch thereof that can effectively solve the above problems.

According to the above objectives, the present disclosure provides an improvement in connector design. The latch includes baffles on both sides, and the two baffles are connected by a handle. In one example, one of the main differences from the conventional design is that, the handle can be suspended relative to a bottom of a baffle by connecting a bottom surface of a main body and the handle via a slope, which can provide space for the user's fingers and increase the convenience of using the connector.

In another example, on the base of the above designs, a metal sheet can be further provided in the baffle, and an anti-wear portion of the metal sheet is exposed through an opening in an inner side of the main body of the baffle. Thus, when the latching column of another connector is pressed into the opening in the inside of the baffle through the anti-wear portion, it can prevent the latching column from directly rubbing against the main body, thereby effectively prolonging the service life of the latch.

In still another example, the injection molding process can be used to continuously cover the cable with multiple layers of insulating material to form an inner mold and an outer mold, so as to provide better waterproofing and impact resistance. In addition, the cable can pass out of the first housing from a lateral surface of the first housing along a width direction of the latch to facilitate installation.

BRIEF DESCRIPTION OF THE DRAWINGS

The aspects of the present disclosure can be better understood by reading the following detailed description, with reference made to the accompanying drawings.

DETAILED DESCRIPTION

Figure 1:
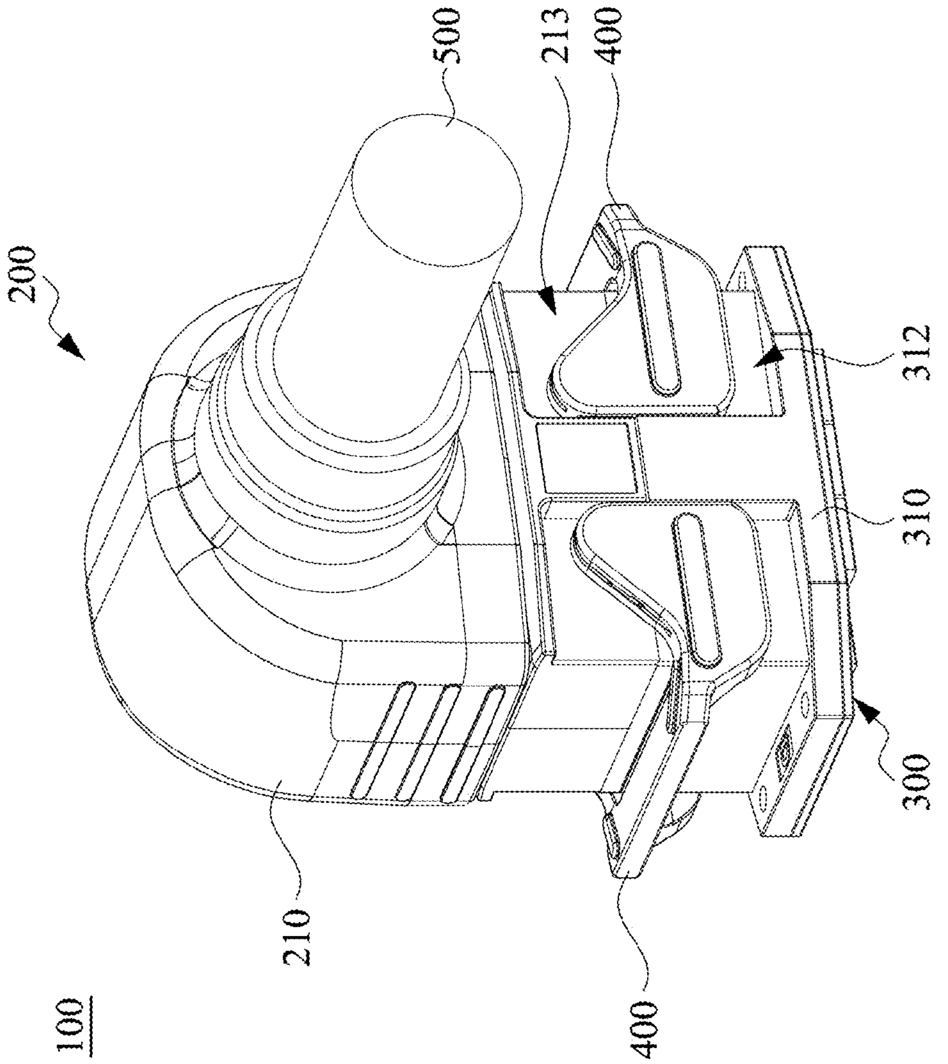
FIG. 1 and FIG. 2 are respectively schematic three-dimensional diagrams of a connector from two angles in accordance with one embodiment of the present disclosure.
Figure 2:
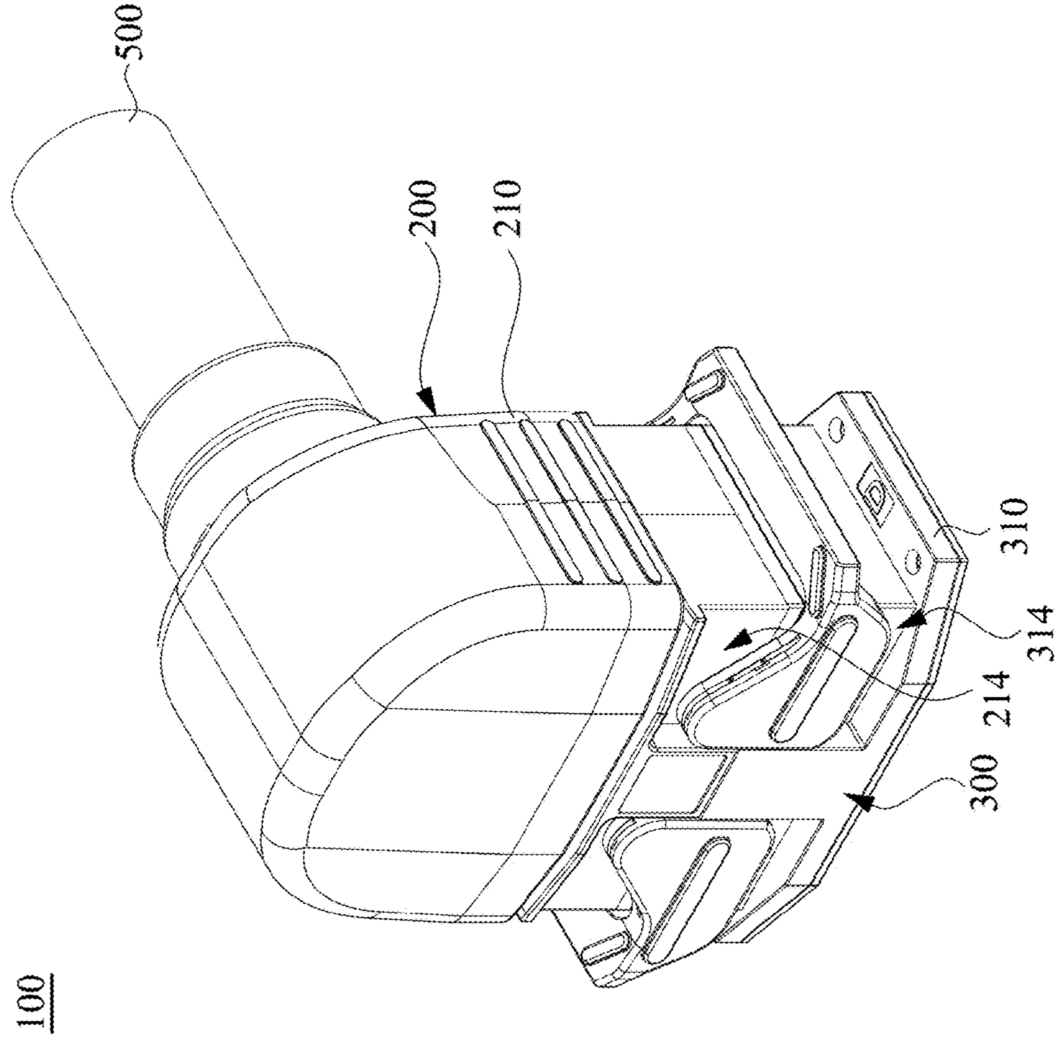

The embodiments of the present disclosure are discussed in detail below. However, it will be appreciated that the embodiments provide many applicable concepts that can be implemented in various specific contents. The embodiments discussed and disclosed are for illustrative purposes only and are not intended to limit the scope of the present disclosure. All of the embodiments of the present disclosure disclose various different features, and these features may be implemented separately or in combination as desired. It should be noted that each drawing is drawn according to the actual proportion of the product. In order to keep the specification concise, the proportions of the components are not listed one by one, but the proportions and positions of the components should be regarded as a part of the content of the present specification. Moreover, if the description in the present specification is insufficient to explain the detailed design of the component and therefore cannot be implemented, the content recited in the China Patent No. CN102763289B or CN1081837C may be referred to as examples.

In addition, the terms "first", "second", and the like, as used herein, are not intended to mean a sequence or order, and are merely used to distinguish elements or operations described in the same technical terms. Furthermore, the spatial relationship between two elements described in the present disclosure applies not only to the orientation depicted in the drawings, but also to the orientations not represented by the drawings, such as the orientation of the inversion.

Referring to FIG. 1 to FIG. 5, one embodiment of the present disclosure provides a connector 100 (first connector), which can be, for example, applied in the field of high-current connectors, for connecting with another connector 300 (second connector) and conducting electrical energy.

In the present embodiment, the first connector 100 is mainly composed of a first connector assembly 200, two latches 400, and a cable 500.

Figure 3:
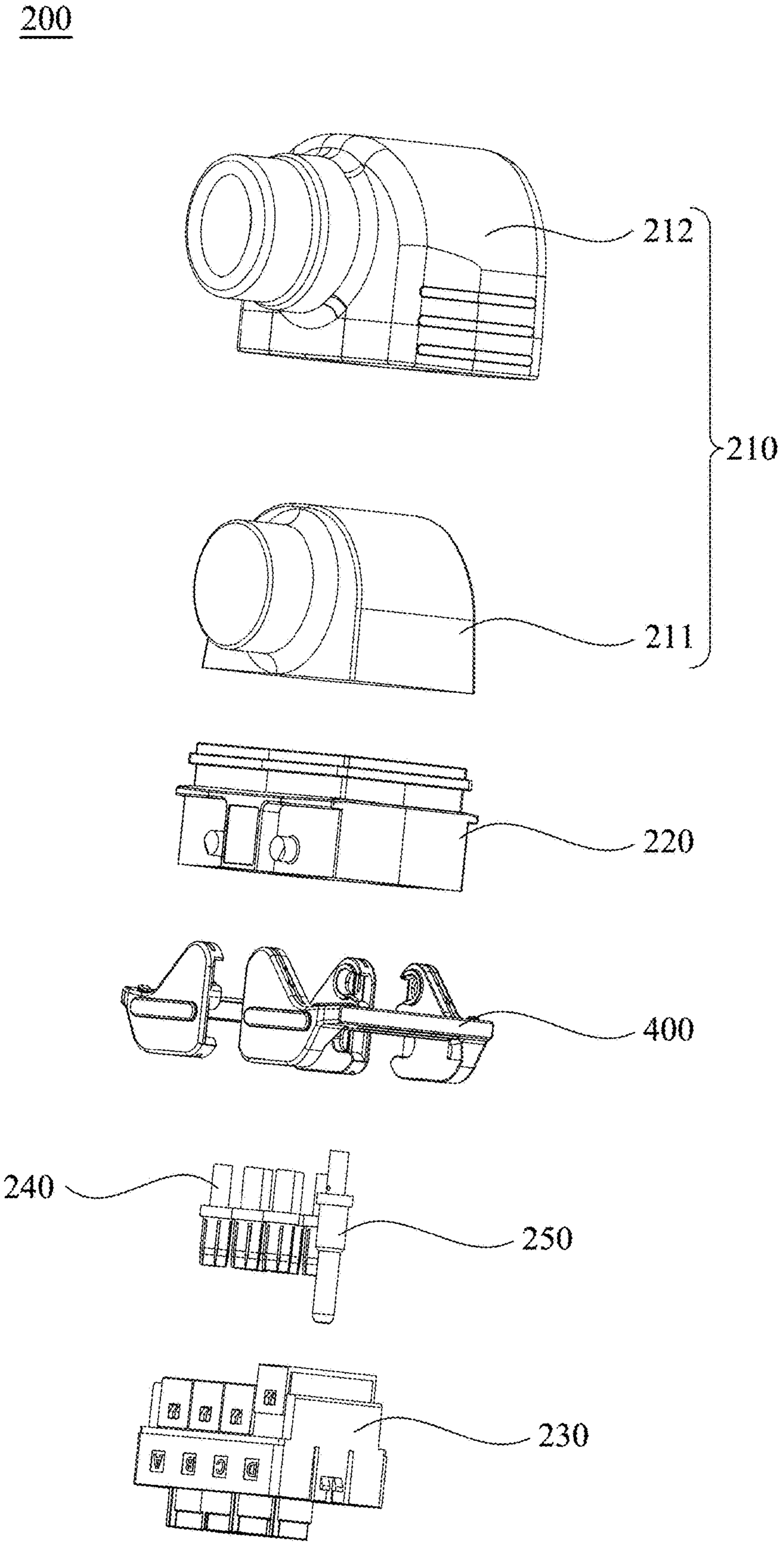
FIG. 3 is an exploded schematic diagram of a connector in accordance with one embodiment of the present disclosure.

As shown in FIG. 3, the first connector assembly 200 is mainly composed of a first housing 210, an outer frame 220, a base assembly 230, plural rod-shaped power supply terminals 240, and at least one grounding terminal 250.

The base assembly 230 includes an integrally formed insulating plastic base and plural back covers, which are latched to the base. There are plural through holes with platforms inside the base, for the shorter female power supply terminals 240 and the longer male grounding terminal 250 to be inserted. The back covers (not labeled) are used to fix the terminals in the through holes. The base assembly 230 can be embedded and fixed in the hollow outer frame 220. Plural wires in the cable 500 are electrically connected to ends of the power supply terminals 240 and the grounding terminal 250 respectively. In this example, the male grounding terminal 250 is longer, such that the surface of the base facing the first housing 210 is stepped, that is, the right side of the base in FIG. 3 is thicker than the other end.

In this example, the first housing 210 is a molded plastic element. In this example, the first housing 210 includes an inner mold 211 and an outer mold 212. The inner mold 211 is formed on the outer frame 220 and one end of the base assembly 230 by using an injection molding process and simultaneously covers an outer surface of the cable 500. The outer mold 212 covers the inner mold 211 in the same manner and is fixed to the outer frame 220. Compared with the traditional assembled design, forming the first housing 210 using an injection molding process can effectively enhance the waterproof performance. Specifically, the aforementioned injection molding process may be an insert molding process. Correspondingly, from an outer contour of the first housing 210 in FIG. 3 and FIG. 4, it can be seen that two tapered stepped hollow cylindrical structures protrude from a lateral surface of the outer mold 212, and the hollow portion is for the cable 500 to pass through. A lateral surface (side surface 213) of the inner mold 211 also has a protruding hollow cylindrical structure, and the hollow portion is for the cable 500 to pass through.

On the other hand, the cable 500 perpendicularly passes through the first housing 210 from the inside of the first housing 210 through its lateral surface along a width direction of the latch 400. In another example, the first housing 210 may be made of assembled components, and the present invention is not limited thereto. That is, the cable 500 and an extension direction of the outlet of the first housing 210 are substantially perpendicular to a length direction of the first connector 100.

Figure 4:
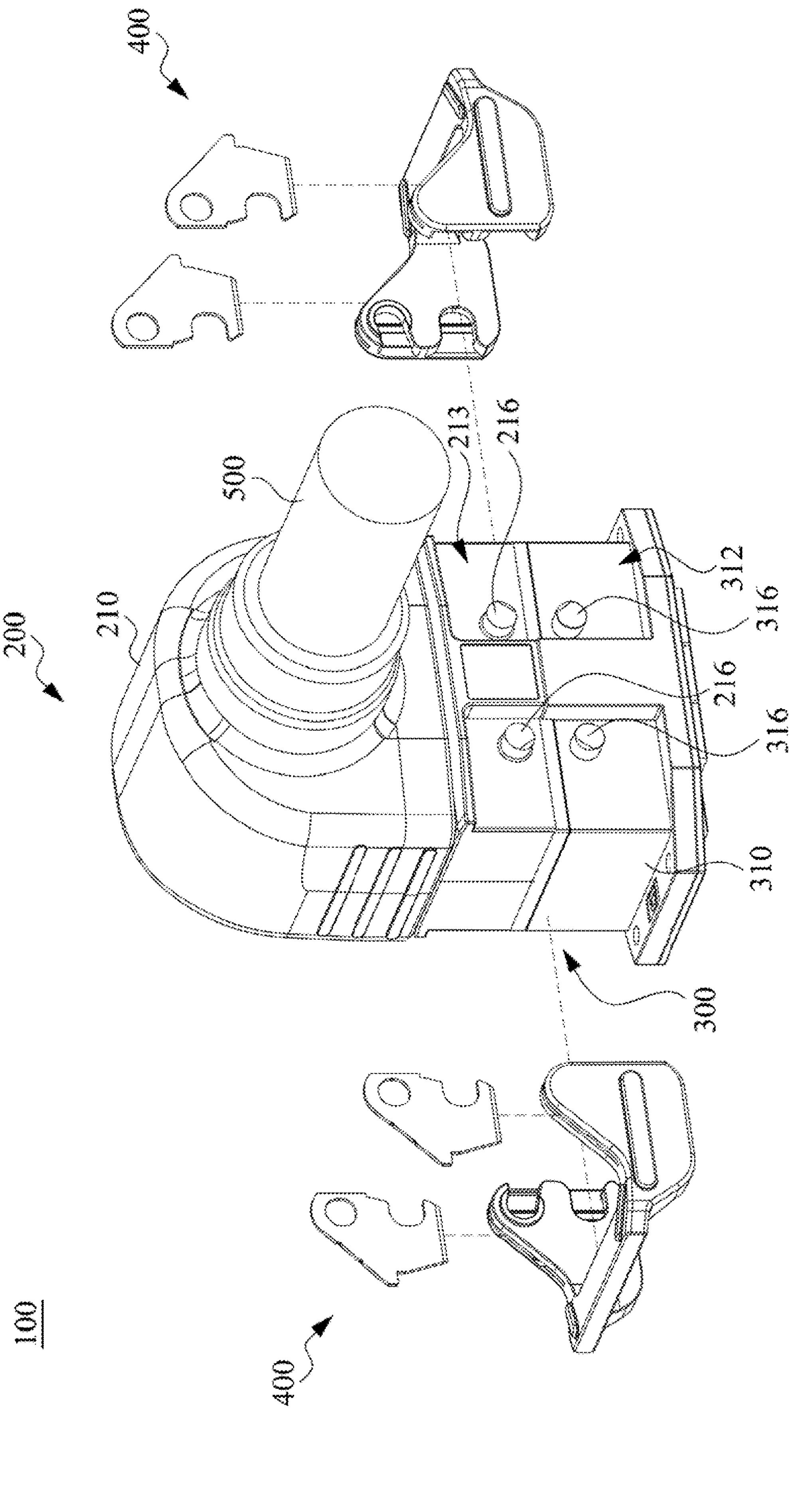
FIG. 4 and FIG. 5 are respectively schematic three-dimensional diagrams of latches detached from a connector from two angles in accordance with one embodiment of the present disclosure.
Figure 5:
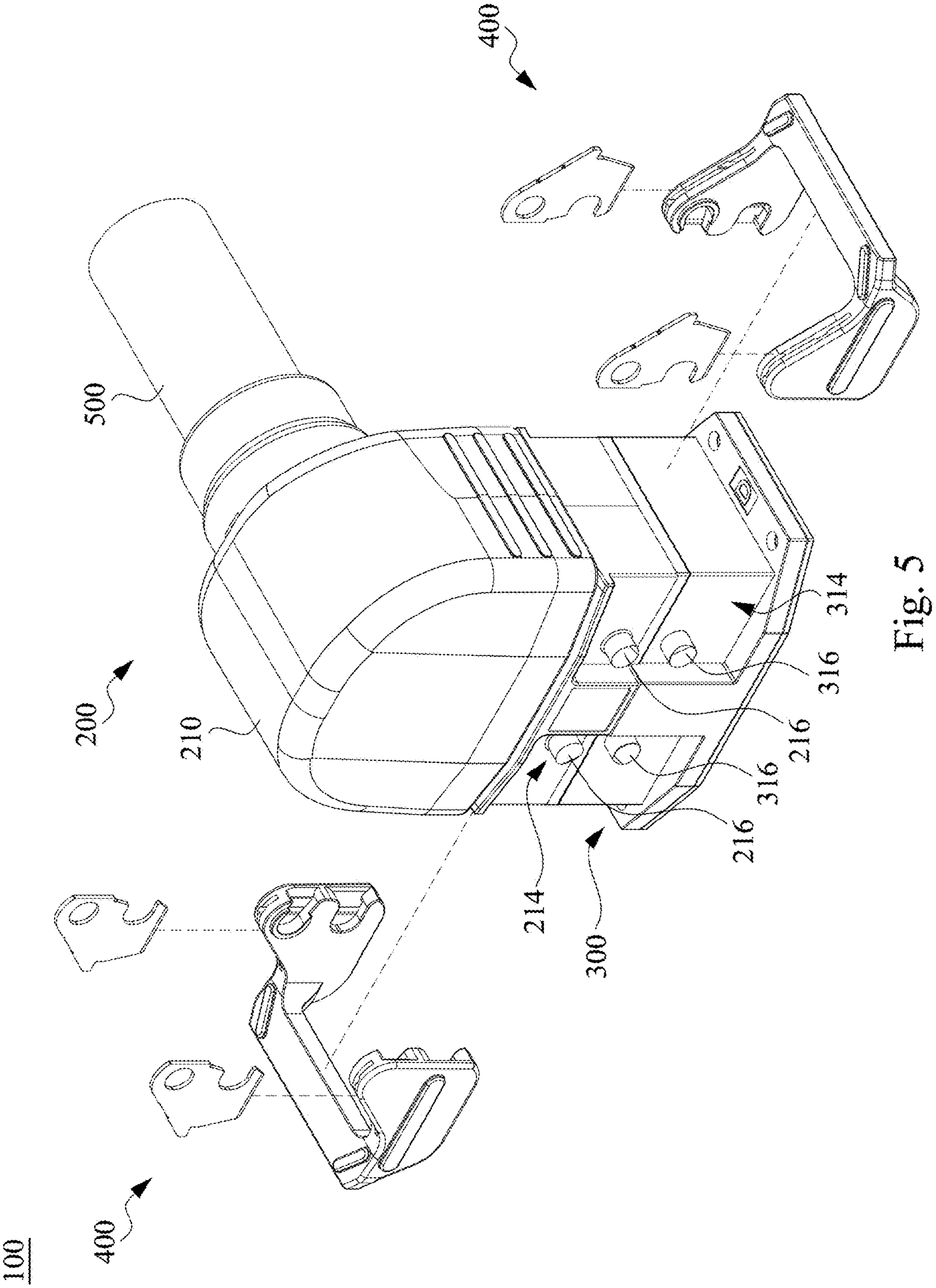

As shown in FIG. 4 and FIG. 5, the first housing 210 has two side surfaces 213 and 214, which are opposite to each other, and two supporting columns 216 are protruding from each of the two side surfaces 213 and 214. The positions of the two supporting columns 216 on the side surface 213 are respectively aligned with the two supporting columns 216 on the side surface 214. The supporting column 216 may be, for example, a cylindrical structure, such that the latch 400 can pivot by using the supporting column 216 as a rotation axis.

A second housing 310 of the second connector 300 is located below the first housing 210. The second housing 310 may be a molded plastic element. As shown in FIG. 4 and FIG. 5, the second housing 310 has two side surfaces 312 and 314 opposite to each other, in which the side surfaces 312 and 314 are respectively located below the side surfaces 213 and 214 of the first housing 210. Two latching columns 316 are protruding from each of the side surfaces 312 and 314. The positions of the latching columns 316 on the side surfaces 312 and 314 are aligned. In additional, the latching columns 316 may be aligned with the supporting columns 216, for example. In this example, the latching column 316 is a cylindrical structure.

Figure 6:
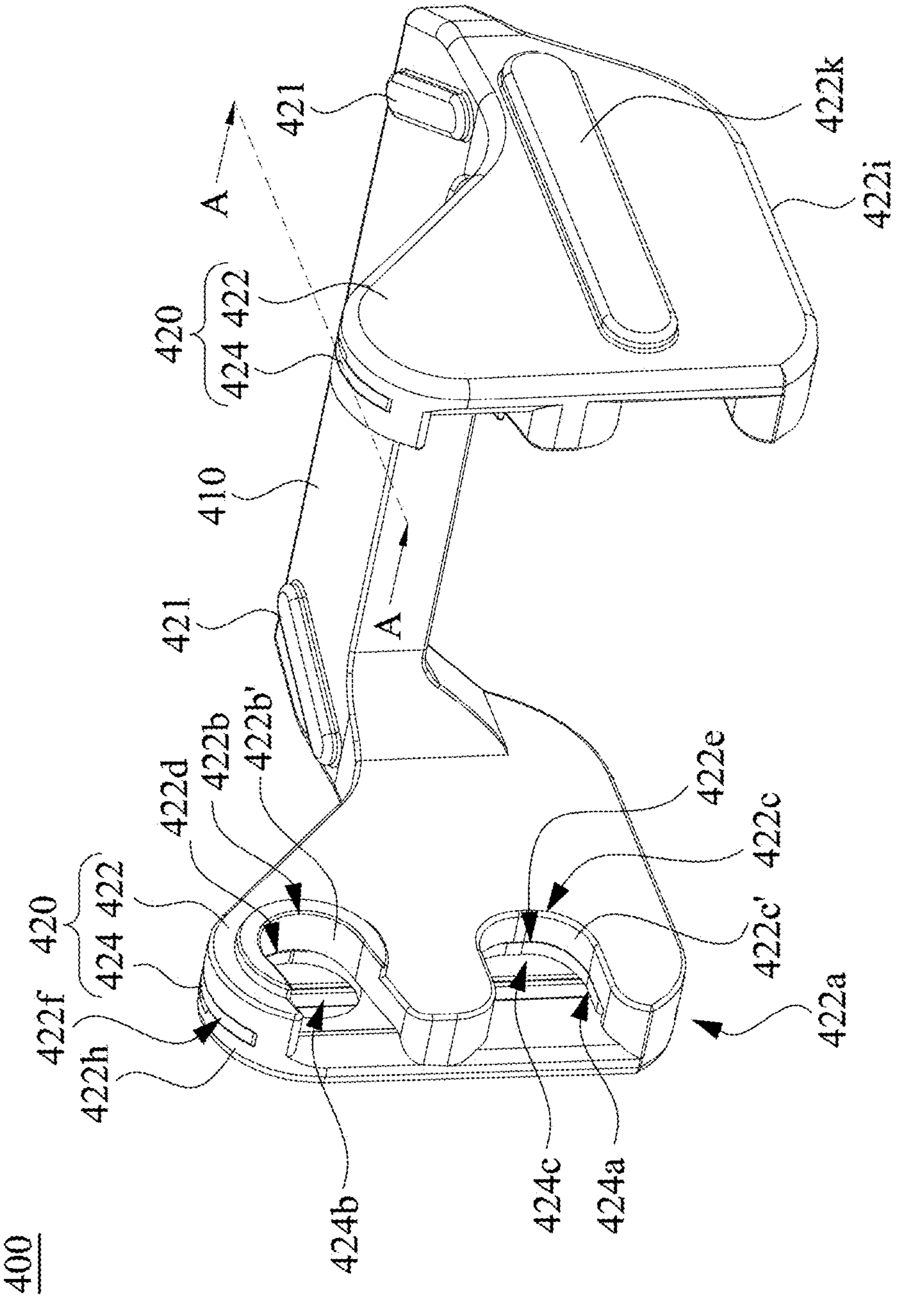
FIG. 6 is schematic three-dimensional diagram of a latch in accordance with one embodiment of the present disclosure.
Figure 7:
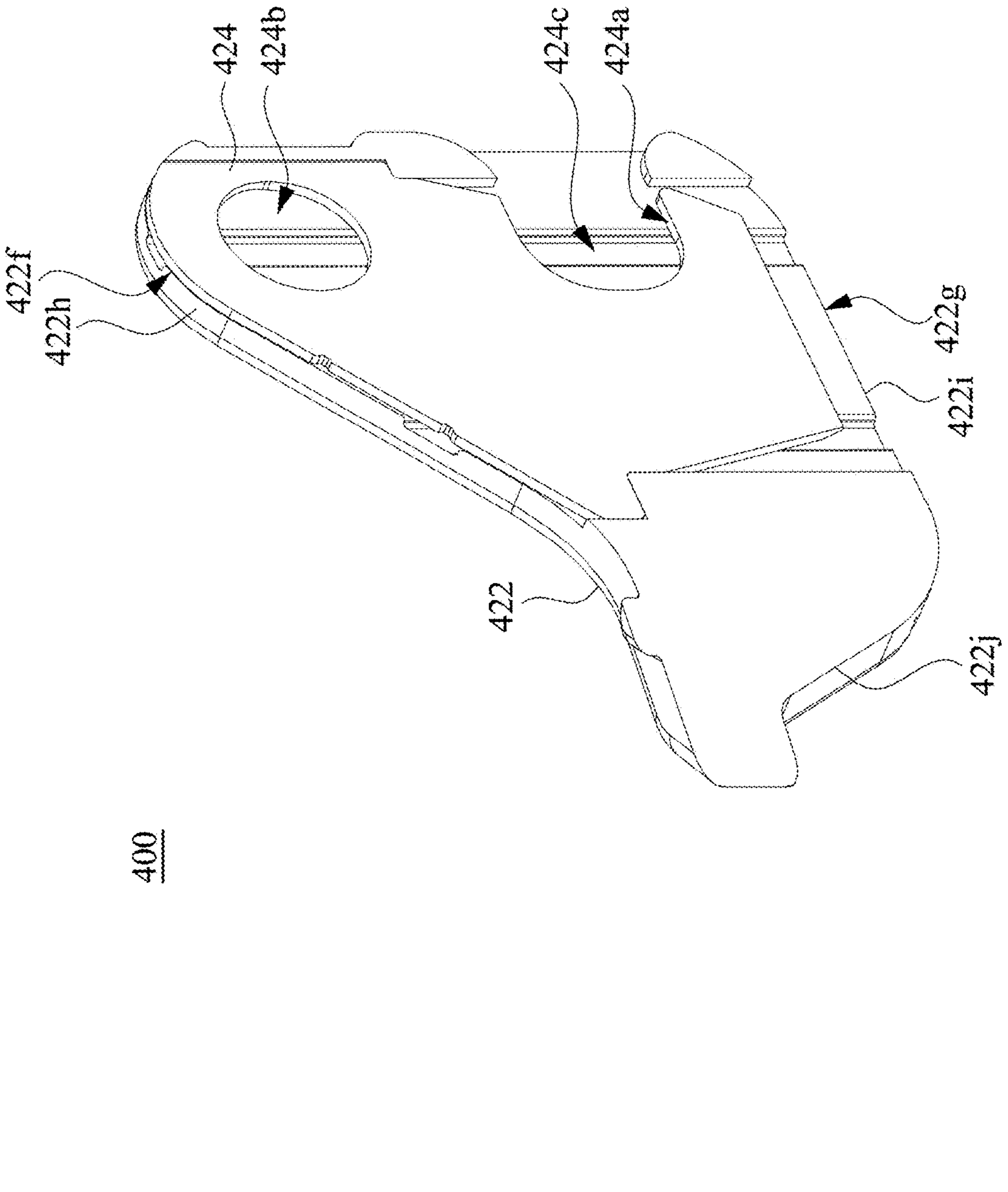
FIG. 7 is schematic cross-sectional view of the latch taken along a line A-A of FIG. 6.

Referring to FIG. 6 and FIG. 7, FIG. 6 and FIG. 7 are respectively a schematic three-dimensional diagram of a latch 400 in accordance with one embodiment of the present disclosure and a schematic cross-sectional view of the latch 400 taken along a line A-A of FIG. 6. The latches 400 can be used to tightly fasten the first connector assembly 200 of the first connector 100 and the second connector 300. In the present embodiment, the latch 400 is mainly consisting of a handle 410 and two baffles 420. The user can pull the latch 400 through the handle 410 to perform latching or unlatching operations. The handle 410 may be, for example, a plate structure. The handle 410 may be a molded plastic element. In this example, the handle 410 and the two baffles 420 are integrally formed.

The two baffles 420 are respectively disposed on two opposite ends of the handle 410 and face each other, so as to form a U-shaped structure with the handle 410. Specifically, the two baffles 420 are vertically connected to the two ends of the handle 410. Each of the baffles 420 may mainly include a main body 422 and a metal sheet 424. The main body 422 may be a molded plastic element. In one example, the handle 410 and the main body 422 are integrally formed. The main body 422 has a front end portion 422a, a pivoting portion 422b, a locking portion 422c, a first opening 422d, a second opening 422e, a third opening 422f, and a fourth opening 422g. The front end portion 422a is the end portion of the main body 422 that is farther away from the handle 410. The pivoting portion 422b and the locking portion 422c are recessed in the front end portion 422a, in which the pivoting portion 422b is located above the locking portion 422c. As shown in FIG. 6, the pivoting portion 422b has an arc-like inner side surface 422b', and the locking portion 422c has an arc-like inner side surface 422c'. In addition, as shown in the right side of FIG. 6, an outer surface of the main body 422 is provided with a protruding external reinforcing rib 422k, and the external reinforcing rib 422k extends horizontally along a length direction of the main body 422.

As shown in FIG. 6, the first opening 422d is located in the inner side surface 422b' of the pivoting portion 422b, and the second opening 422e is located in the inner side surface 422c' of the locking portion 422c. As shown in FIG. 7, the third opening 422f is located in a top surface 422h of the main body 422, and the fourth opening 422g is located in a bottom surface 422i of the main body 422. The first opening 422d, the second opening 422e, the third opening 422f, and the fourth opening 422g can communicate with each other and form a space for the metal sheet 424 to be accommodated therein.

The metal sheet 424 is embedded in the main body 422. In one example, as shown in FIG. 6 and FIG. 7, the metal sheet 424 may extend sequentially from the top surface 422h of the main body 422 through the pivoting portion 422b and the locking portion 422c to a position adjacent to the bottom surface 422i of the main body 422. In another example, the metal sheet 424 may extend to the bottom surface 422i of the main body 422. The metal sheet 424 has an anti-wear portion 424a, in which the anti-wear portion 424a is located in the second opening 422e and exposed through the second opening 422e. In one example, the anti-wear portion 424a of the metal sheet 424 is level with the inner side surface 422c' of the locking portion 422c. The so-called level means that the height difference between the two surfaces is smaller than a tolerance range of 2 mm. For example, when the anti-wear portion 424a of the metal sheet 424 protrudes from the inner side surface 422c' of the locking portion 422c by a height of 1 mm, the two are said to be level. In another example, the anti-wear portion 424a of the metal sheet 424 protrudes from the inner side surface 422c' of the locking portion 422c. The so-called protrusion means that the difference between the two surfaces is greater than or equal to 2 mm.

Therefore, the anti-wear portion 424a of the metal sheet 424 can prevent the inner side surface 422c' of the locking portion 422c from being excessively worn, which may damage the main body 422 of the baffle 420, thereby prolonging the service life of the latch 400.

In one example, the metal sheet 424 is located in the first opening 422*d*, the second opening 422*e*, and the third opening 422*f*. Specifically, as shown in FIG. 6 and FIG. 7, the metal sheet 424 has a hole 424*b* and a recess 424*c*, in which the hole 424*b* corresponds to the pivoting portion 422*b*, and the recess 424*c* corresponds to the locking portion 422*c*. In one example, the hole 424*b* of the metal sheet 424 is aligned with the pivoting portion 422*b*, and the anti-wear portion 424*a* of the metal sheet 424 is located in the recess 424*c*. In another example, the hole 424*b* of the metal sheet 424 is exposed through the first opening 422*d* located in the inner side surface 422*b*' of the pivoting portion 422*b*.

Referring to FIG. 4 to FIG. 7 simultaneously, the four supporting columns 216 on the first housing 210 of the first connector assembly 200 can respectively pass through the pivoting portions 422*b* of the main bodies 422 of the two baffles 420 and the holes 424*b* of the metal sheets 424. The supporting columns 216 are pivotally connected to the pivoting portions 422*b* and the metal sheets 424, such that the latches 400 can rotate with the supporting columns 216 as rotation axes. The supporting columns 216 pass through the holes 424*b* of the metal sheets 424, and the metal sheets 424 are more wear-resistant than the plastic pivoting portions 422*b*, such that the service life of the baffles 420 can be effectively prolonged.

In the latching operation of the latch 400, the latch 400 pivots toward the latching columns 316 on the second housing 310 of the second connector 300, such that each of the latching columns 316 is pressed into the locking portion 422*c* of the main body 422 and the recess 424*c* of the metal sheet 424, so as to press the first housing 210 and the second housing 310 against each other. Since the anti-wear portion 424*a* of the metal sheet 424 is exposed through the second opening 422*e* located in the inner side surface 422*c*' of the locking portion 422*c*, when the latching column 316 is pressed into the locking portion 422*c*, the latching column 316 slides through the anti-wear portion 424*a*. The metal sheet 424 is relatively wear-resistant, such that the design in which the anti-wear portion 424*a* is exposed in the locking portion 422*c* can increase the durability of the baffle 420 and effectively prolong the service life of the latch 400.

In addition, referring to FIG. 6, in this example, the handle 410 is suspended relative to the bottom surface 422*i* of the baffle 420. More specifically, referring to FIG. 7, the handle 410 is connected to the bottom surface 422*i* of the baffle 420 via the slope 422*j* on the left side of the figure. Therefore, the space formed by the suspended handle 410 allows the user to insert his fingers to pull the latch 400 upward. In addition, in this example, the aforementioned slope 422*j* is an incline, but in another example, it may be a vertical slope.

In addition, referring to FIG. 6, the handle 410 is provided with protruding oblique reinforcing ribs 421 respectively at two turning points of the connection portions between the upper and lower surfaces of the handle 410 in the figure and the baffle 420 to prevent the handle 410 from deforming due to force when the handle 410 is pulled. One end of the oblique reinforcing rib 421 points to a width direction of the baffle 420, and the other end points to an outer edge of the handle 410.

According to the aforementioned embodiments, the present disclosure provides four openings in the main body of the baffle of the latch, embeds the metal sheet in the main body, and exposes the anti-wear portion of the metal sheet through the opening of the locking portion. Therefore, when the latching column of the second connector is latched, the latching column can be latched into the locking portion through the anti-wear portion, which can prevent the latching column from directly rubbing against the main body, thereby effectively prolonging the service life of the latch. Furthermore, the opening of the metal sheet is exposed through the opening of the pivoting portion, and the supporting column of the first connector assembly can pass through the opening of the metal sheet, such that the wear resistance of the baffle during pivoting can be improved, and the service life of the latch can be further prolonged.

Although the present disclosure has been disclosed above with embodiments, it is not intended to limit the present disclosure. Any person having ordinary skill in the art can make various changes and modifications without departing from the spirit and scope of the present disclosure. Therefore, the protection scope of the present disclosure should be defined by the scope of the appended claims.

What is claimed is:

1. A latch, comprising:

a handle; and two baffles respectively disposed on two opposite ends of the handle and opposite to each other, wherein each of the baffles comprises a main body and a metal sheet, wherein a front end portion of the main body is recessed with a pivoting portion and a locking portion, the main body has a first opening and a second opening, the first opening communicates with an inner side surface of the pivoting portion, the second opening communicates with an inner side surface of the locking portion, wherein, the metal sheet is disposed in the main body, wherein the metal sheet has an anti-wear portion, and the anti-wear portion is exposed through the second opening.

2. The latch of claim 1, wherein the main body of each of the baffles further has a third opening and a fourth opening located in a top surface and a bottom surface of the main body respectively.

3. The latch of claim 2, wherein the metal sheet is located in a space between the third opening and the fourth opening.

4. The latch of claim 1, wherein the anti-wear portion is level with the inner side surface of the locking portion, and the metal sheet has a hole aligned with the pivoting portion.

5. The latch of claim 1, wherein the metal sheet has a recess, and the anti-wear portion is located in the recess.

6. The latch of claim 1, wherein each of two turning points of connection portions between the handle and the baffles is provided with an oblique reinforcing rib.

7. The latch of claim 1, wherein an upper part of the main body has an upper inclined surface facing the handle, and a lower part of the main body has a lower inclined surface facing the handle, the upper inclined surface and the lower inclined surface substantially taper toward each other and converge at the handle, thereby suspending the handle.

8. The latch of claim 7, wherein along an outer periphery of the main body, the upper inclined surface transitions sequentially into an intermediate surface of the main body, a bottom surface of the main body, and the lower inclined surface.

9. A connector, comprising:

a connector assembly comprising a first housing, wherein two supporting columns are protruding from each of two opposite side surfaces of the first housing; and two latches, and each of the latches comprising:

a handle; and two baffles respectively disposed on two opposite ends of the handle and opposite to each other, wherein each of the baffles comprises a main body and a metal sheet, wherein a front end portion of the main body is recessed with a pivoting portion and a locking portion, the main body has a first opening and a second opening, the first opening communicates with an inner side surface of the pivoting portion, the second opening communicates with an inner side surface of the locking portion, and wherein the pivoting portions of the latches are pivotally connected to the corresponding supporting columns respectively, wherein, the metal sheet is disposed in the main body, wherein the metal sheet has an anti-wear portion, and the anti-wear portion is exposed through the second opening.

10. The connector of claim 9, further comprising a cable, wherein the connector assembly is a wire end connector, the first housing comprises an inner mold and an outer mold, the inner mold is formed on a surface of the cable by using an injection molding process, the outer mold is formed on a surface of the inner mold by using the injection molding process, and the cable passes out of the first housing from a lateral surface of the first housing along a width direction of the latches.

11. The connector of claim 9, wherein the anti-wear portion is level with the inner side surface of the locking portion, and the metal sheet has a hole aligned with the pivoting portion.

12. The connector of claim 9, wherein the main body of each of the baffles further has a third opening and a fourth opening located in a top surface and a bottom surface of the main body respectively.

13. The connector of claim 12, wherein the metal sheet is located in a space between the third opening and the fourth opening.

14. The connector of claim 9, wherein the metal sheet has a recess, and the anti-wear portion is located in the recess.

15. The connector of claim 9, wherein each of two turning points of connection portions between the handle and the baffles is provided with an oblique reinforcing rib.

16. The connector of claim 9, wherein an upper part of the main body has an upper inclined surface facing the handle, and a lower part of the main body has a lower inclined surface facing the handle, the upper inclined surface and the lower inclined surface substantially taper toward each other and converge at the handle, thereby suspending the handle.

* * * * *